United States Patent Office 3,422,189
Patented Jan. 14, 1969

---

3,422,189
METHOD AND COMPOSITIONS FOR THE TREATMENT OF GASTRO-INTESTINAL DISORDERS
Joseph Alfred Rider, Mill Valley, Calif., assignor to Moraine Products, Owosso, Mich., a corporation of Michigan
No Drawing. Filed Jan. 2, 1959, Ser. No. 784,466
U.S. Cl. 424—127                                     6 Claims
Int. Cl. A61k 25/00

---

ABSTRACT OF THE DISCLOSURE

Flatulency symptoms are alleviated by a method comprising the administration of compositions which contain an organopolysiloxane and a finely divided silica or a silica aerogel.

---

This invention relates to the treatment of gas producing, gastro-intestinal conditions. It is more specifically concerned with a therapeutically active composition and method of treatment for alleviating the flatulency of intestinal diseases or disorders which are associated with or produce gas.

The chief purpose of the alimentary system is to provide a nucosal surface to which prepared food is applied so that the nutritive material can be absorbed. It is important, therefore, that positive acting medicaments be available to alleviate any malfunctioning of the system in order that normal body nutrition processes can be effectively carried out and relief from any discomfort incident to such malfunctioning be obtained. There are a number of diseases of the gastro-intestinal tract which are associated with, or produce intestinal gas such as functional bowel distress, spastic colitis, hiatus hernia, pyloro-spasm, aerophagia, chlolelithiasis, diverticulitis, atrophic gastritis, gas associated with pregnancy, and others. The intestinal gas which is produced or associated with these diseases is to be distinguished from the foamy secretions which reflux from the duodenum or pass into the stomach as swallowed saliva under normal conditions. This latter condition of bubbles in the gastric juices is reduced for the purposes of permitting an adequate view to be obtained of the mucosa during gastroscopy by the use of silicone antifoaming agents. Administration of these agents has been in the form of emulsions taken orally, in capsules in dosages of 5.0 cc. of Antifoam AF Emulsion (Dow Corning Corp.) tablets containing 5 mg. of Antifoam A, or other types of unit dosages.

According to this invention it has been found that unit dosages of an anti-foam composition comprising a substantially linear organo-polysiloxane and a finely divided silica are effective medicaments for the relief of the flatulency accompanying diseases of the gastro-intestinal tract which are associated with or produce gas. To facilitate the treatment of these diseases 20–40 milligrams of the selected anti-foam composition are preferably incorporated in tablets employing various non-toxic, solid tabletting materials such as lactose, calcium carbonate, aluminum hydroxide, and others. If desired, other functional adjuncts can be added to the tablet for the relief and treatment of other symptoms. For example, meprobamate, phenobarbital, or belladonna could be used in tablets used for the relief of the flatulency associated with spastic colitis, functional bowel disorders, or nervous indigestion for the treatment of other symptoms of these disorders. It is to be noted that the tabletting material can also function as an active ingredient of the composition.

The linear organo-polysiloxanes utilized in formulating the medicaments of this invention are preferably prepared by the conventional polymerization of silicones by the hydrolysis and chemical condensation of one or more hydrolyzable silicone compounds having the general formula $$R_2SiX_2$$

where R is a lower alkyl group having 1–8 carbon atoms per substituent group and X is a halogen or an alkoxy group; e.g. dimethyl dichlorosilane, diethyl dichlorosilane, dimethyl diethoxysilane, methyl ethyl dichlorosilane, dibutyl dichlorosilane, dioctyl chlorosilane, ethyl butyl diethoxysilane, and others. The hydrolyzable silicone compound is reacted with water under selected reaction conditions to prepare a polysiloxane of the desired viscosity. The preferred polysiloxane which is used is dimethyl polysiloxane. For the purposes of this invention polysiloxanes having viscosities within the range of about 50 to 5000 centistokes and preferably 100 to 1000 centistokes are employed.

To produce a composition having the desired functional effect for the purposes of this invention a finely divided silica such as a silica aerogel prepared by removing the water from a hydrogel in accordance with the Kistler method (Kistler, J. Phys. Chem. 36, page 52, 1932) to produce cellular structure; the pyrolysis of a volatile silicone compound such as silicone tetrachloride; or other suitable methods is added to the polysiloxane. Suitable finely divided silicas of the former type are the Santocels marketed by Monsanto Chemical Co. and of the latter type are the Cab-O-Sils marketed by the Godfrey L. Cabot Co.

In preparing the medicaments of this invention the finely divided silica is employed in an amount sufficient to form a viscous mixture having from a honey-like to a salve-like consistency. Generally 1–10% by weight, based on the organo-polysiloxane employed, can be used with proportions of about 3–7% being preferred. The compositions of this invention can however function effectively utilizing proportions outside these ranges.

Illustrative specific embodiments of the invention include, but are not limited to the following compositions.

| | | |
|---|---|---|
| Anti-foaming agent [1] | mg. | 20 |
| Lactose | mg. | 330 |
| Phenobarbital | grains | ¼ |
| Anti-foaming agent [1] | mg. | 20 |
| Lactose | mg. | 330 |
| Phenobarbital | grains | ½ |
| Anti-foaming agent [1] | mg. | 20 |
| Phenobarbital | grains | ¼ |
| Belladonna | do | ⅛ |
| Lactose | mg. | 330 |
| Anti-foaming agent [1] | mg. | 20 |
| Phenobarbital | grains | ½ |
| Belladonna | do | ⅛ |
| Lactose | mg. | 330 |
| Anti-foaming agent [1] | mg. | 20 |
| Lactose | mg. | 330 |
| Meprobamate | mg. | 400 |
| Anti-foaming agent [1] | mg. | 20 |
| Calcium carbonate | mg. | 330 |
| Anti-foaming agent [1] | mg. | 20 |
| Aluminum hydroxide | mg. | 330 |
| Anti-foaming agent [1] | mg. | 20 |
| Lactose | mg. | 330 |
| Dihydroxy aluminum amino acetate | gram | 0.5 |
| Anti-foaming agent [1] | mg. | 20 |
| Magnesium trisilicate | mg. | 300 |
| Aluminum hydroxide | mg. | 200 |

[1] A liquid of honey-like consistency consisting of a mixture of 95.4 weight percent of a dimethyl polysiloxane having a viscosity of 350 centistokes and 4.6 weight percent of silica aerogel having a density of 4.3 pounds per cubic foot and sized such that there is a 1.5% retention on a 325 mesh screen.

These compositions were tableted employing conventional tablet forming equipment. The preferred schedule employing 20 milligram tablets is two tablets after each meal and at bedtime until asymptomatic conditions result.

In the treatment of several human adult patients of both sexes who respectively had spastic colitis, hiatus hernia, functional bowel distress, cholelithiasis, and pylorospasm employing lengths of treatment of 1 to 17 months, the dosage ranged from 20 milligrams of the aforementioned illustrative anti-foaming agent taken three times a day to 50 milligrams of the anti-foaming agent taken four times a day in tablet form employing 330 milligrams of lactose as the tabletting material. The usual schedule was to take the tablets after each meal and at bedtime. In some instances in addition to the aforementioned prescribed dosages additional tablets were taken when necessary. Excellent results were obtained in alleviating the flatulency accompanying the aforementioned disorders whereas other treatment programs employing usual medications for the relief of symptoms due to intestinal gas did not yield positive results.

It is apparent from the foregoing illustrative description of the instant invention that variations can be made by those skilled in the art. Various tabletting materials such as starches, sucrose, etc. and amounts can be used to provide proper tablet size, suitable disintegration, rapid solubility, as well as stabilization. In the event that it is desirable to effect the treatment of the intestinal tract, enteric or other types of coatings can be used.

Accordingly, I claim as my invention.

1. The method for alleviating flatulency symptoms of gastro-intestinal disorders in a human associated with and producing intestinal gas which comprises periodically introducing into a malfunctioning, flatulent, gastro-intestinal tract an anti-foaming agent comprising a major proportion of an organo-polysiloxane and a minor proportion of a finely divided silica in amounts sufficient to relieve said symptoms.

2. The method for alleviating flatulency symptoms of gastro-intestinal disorders in a human associated with and producing intestinal gas which comprises periodically introducing into a malfunctioning, flatulent, gastro-intestinal tract unit dosages of an anti-foaming agent comprising a major proportion of an organo-polysiloxane and a minor proportion of a finely divided silica in total daily amounts of not less than 20 milligrams.

3. The method for alleviating flatulency symptoms of gastro-intestinal disorders in a human associated with and producing intestinal gas which comprises periodically introducing into a malfunctioning, flatulent, gastro-intestinal tract unit dosages of an anti-foaming agent comprising a major proportion of a dimethyl polysiloxane and a minor proportion of a finely divided silica in total daily amounts of not less than about 20 milligrams.

4. The method for alleviating flatulency symptoms of gastro-intestinal disorders in a human associated with and producing intestinal gas which comprises periodically introducing into a malfunctioning, flatulent, gastro-intestinal tract unit dosages of an anti foaming agent comprising a major proportion of a dimethyl polysiloxane and a minor proportion of a silica aerogel in total daily amounts of not less than about 20 milligrams.

5. The method for alleviating flatulency symptoms of gastro-intestinal disorders in a human associated with and producing intestinal gas which comprises periodically introducing into a malfunctioning, flatulent, gastro-intestinal tract an anti-foaming agent comprising a major proportion of a dimethyl polysiloxane and 1–10% by weight, based on said polysiloxane, of a silica aerogel in total daily amounts of about 20 milligrams.

6. A method which consists of administering orally a composition comprising at least 50 milligrams of (1) a methylpolysiloxane having a viscosity of from 250 to 1000 cs. at 25° C. and (2) from 2 to 10 parts per 100 parts of (1) of a finely-divided silica filler, to a human patient whereby pains caused by the accumulation of gas in the digestive tract of the patient are relieved.

References Cited

UNITED STATES PATENTS

| 2,635,981 | 4/1953 | Austin | 167—53 |
| 2,830,010 | 4/1958 | Valentine | 167—82 |
| 2,934,472 | 4/1960 | May | 167—55 |
| 2,951,011 | 8/1960 | Feinstone | 167—55 |

FOREIGN PATENTS

| 485,188 | 5/1938 | Great Britain. |
| 208,685 | 6/1957 | Australia. |
| 536,539 | 1/1957 | Canada. |

OTHER REFERENCES

McGregor: Silicones in Medicine and Surgery, 1957, pp. 27 and 29.

U.S. Dispensatory 25th Ed., 1955, Lippincott Co., Philadelphia, Pa., p. 1848.

Barondes: The Military Surgeon, May 1950, pp. 379, 380 and 385.

FRANK CACCIAPAGLIA, JR., Primary Examiner.

U.S. Cl. X.R.

424—184